United States Patent [19]

Hirayama et al.

[11] Patent Number: 4,875,384
[45] Date of Patent: Oct. 24, 1989

[54] THROTTLE LEVER MECHANISM

[75] Inventors: Koji Hirayama, Ome; Fumihiko Aiyama, Musashimurayama, both of Japan

[73] Assignee: Kioritz Corporation, Tokyo, Japan

[21] Appl. No.: 119,928

[22] Filed: Nov. 13, 1987

[30] Foreign Application Priority Data

Nov. 14, 1986 [JP] Japan .................. 61-174887

[51] Int. Cl.⁴ .............................................. F16C 1/10
[52] U.S. Cl. ................................. 74/500.5; 74/503.4; 74/502.6; 74/471 R
[58] Field of Search ............ 74/500.5, 501.5 R, 501.6, 74/502, 502.4, 502.6, 471 T, 471 XY

[56] References Cited

U.S. PATENT DOCUMENTS

| | | | |
|---|---|---|---|
| 2,847,872 | 8/1958 | Todd | 74/501.6 |
| 2,853,164 | 9/1958 | Sturdy | 74/501.6 |
| 3,314,405 | 4/1967 | Irgens . | |
| 3,361,165 | 1/1968 | Irgens . | |
| 3,986,363 | 10/1976 | Beaman et al. | 74/502.4 |
| 4,007,647 | 2/1977 | Carlson | 74/502.4 |
| 4,245,713 | 1/1981 | Mochida et al. | 74/502.4 |
| 4,374,597 | 2/1983 | Mochida | 74/500.5 |
| 4,586,341 | 5/1986 | Kobus | 74/502.4 |

FOREIGN PATENT DOCUMENTS

| | | |
|---|---|---|
| 3023033 | 1/1982 | Fed. Rep. of Germany . |
| 2548574 | 1/1985 | France . |
| 2558567 | 7/1985 | France . |
| 2569367 | 2/1986 | France . |

Primary Examiner—Vinh Luong
Attorney, Agent, or Firm—Browdy and Neimark

[57] ABSTRACT

A throttle lever mechanism in which both ends of a wire cable arranged in a curved manner are connected to a throttle valve opening/closing member of a carburetor and a first throttle lever, respectively, one end portion of an outer tube covering the wire cable is held in a stationary manner, the other end portion of the outer tube is coupled to a link member supported rotatably, and the link member is connected to a second throttle lever through a connecting rod movable within an elongated slot formed in the link member.

2 Claims, 5 Drawing Sheets

4,875,384

THROTTLE LEVER MECHANISM

BACKGROUND OF THE INVENTION

1. Field of the Invention

The present invention relates to a throttle lever mechanism and more particularly to a so-called failure proof mechanism such that a throttle lever adjustment is possible only by combining operational actions of two throttle levers.

2. The Prior Art

A throttle lever mechanism provided with a safety locking means is adapted in view of the safety aspect in order to avoid a possible danger for engine drive control, in particular, for controlling a handy type working machine such as engine-driven type hedge trimmer or the like. The throttle lever mechanism is such that the throttle lever is operable only in the case where the safety locking means is intentionally unlocked. In such a mechanism, even if the operator's hand must separate away from the throttle lever due to some reason and there would be a danger that the working machine body could not be held well, the throttle would not be returned immediately back to the initial position. Thus, there is a fear that it would be impossible to stop the working section such as a cutter blade by returning the engine to the idle speed condition.

SUMMARY OF THE INVENTION

An object of the present invention is to provide a safety throttle lever mechanism which causes a working section to be operable only in the case where the working machine is held by both operator's hands, and which is simple in construction, small in number of mechanical parts, high in reliability and low in cost to overcome the disadvantages inherent in the prior art mechanism.

The throttle lever mechanism according to the invention is characterized in that both ends of a wire cable arranged in a curved manner are connected to a throttle valve opening/closing member of a carburetor and a first throttle lever, respectively, one end portion of an outer tube covering the wire cable is held in a stationary manner, the other end portion of the outer tube is coupled to a link member supported rotatably, and the link member is connected to a second throttle lever through a connecting rod movable within an elongated slot formed in the link member.

Accordingly, in the throttle lever mechanism according to the invention, the number of necessary mechanical parts is reduced by utilizing the relative movement between the wire cable and the outer tube covering the wire cable. At the same time, the safety aspect and the reliability of the throttle lever mechanism are enhanced, and the manufacture cost is reduced while facilitating the maintenance.

In other words, in the throttle lever mechanism according to the present invention, since rigidity of the wire cable and the outer tube covering the wire cable is reasonably utilized to reduce the number of the mechanical parts and portions where mechanical wear would be likely to be generated, it is possible to considerably simplify the safety mechanism for the throttle levers and to enhance the working safety aspect and the reliability while reducing the manufacture cost.

DESCRIPTION OF THE PREFERRED EMBODIMENTS

The present invention will now be described with reference to the accompanying drawings.

Figure 1:
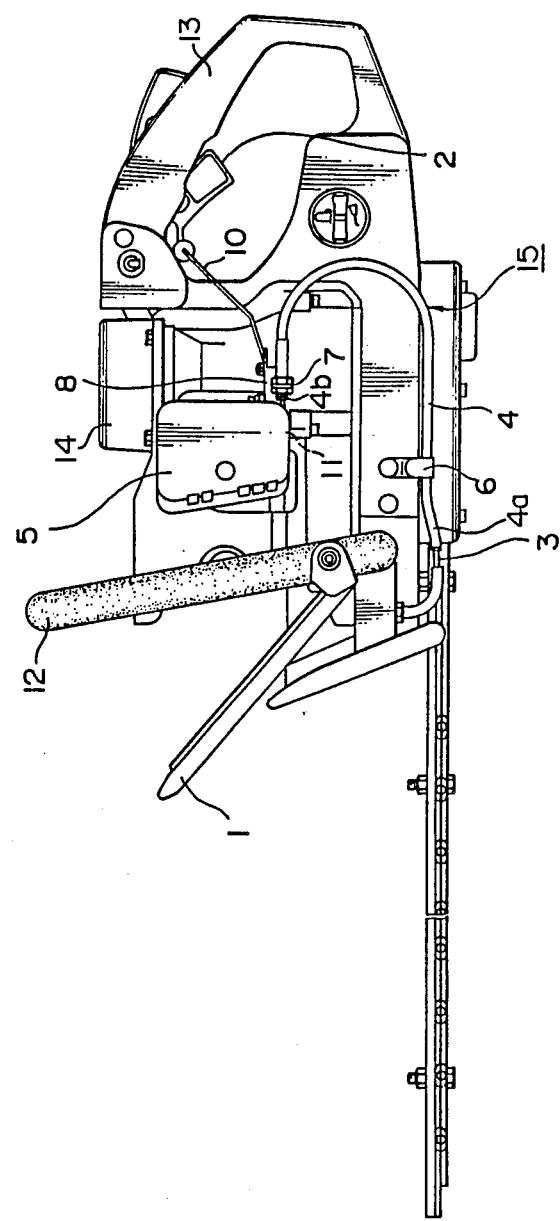
FIG. 1 is a front elevational view showing one example in which a throttle lever mechanism according to the present invention is used.
Figure 2:
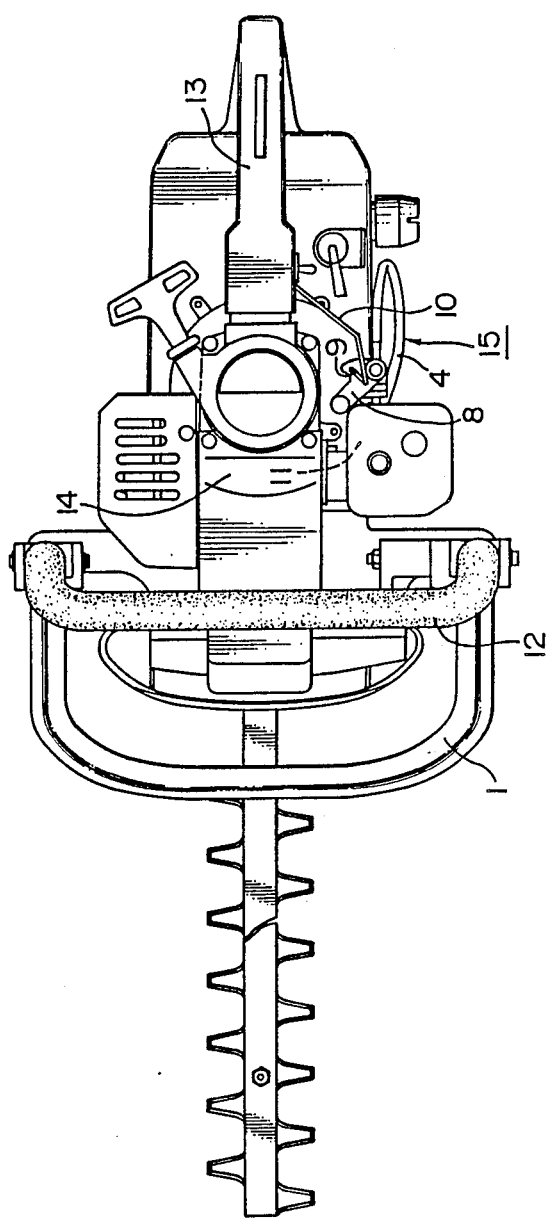
FIG. 2 is a plan view of the example shown in FIG. 1.

FIGS. 1 and 2 are a front elevational view and a plan view, respectively, showing an engine-driven type hedge trimmer provided with a throttle safety mechanism according to the present invention.

Figure 3:
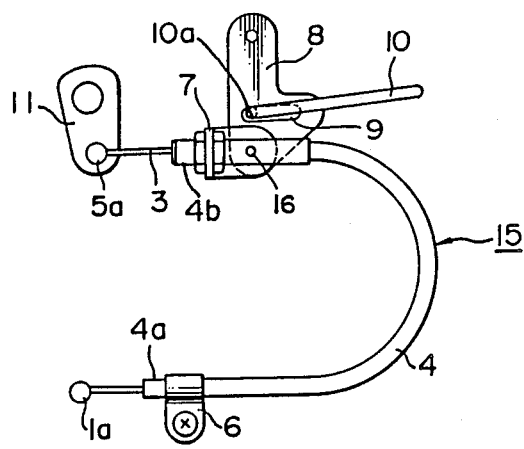
FIG. 3 is a schematic view showing one embodiment of the throttle lever mechanism according to the present invention.

The throttle lever mechanism shown comprises a drive means composed of a few of parts and a throttle cable is arranged in a curved manner. The throttle cable 15 is composed of a wire cable 3 and an outer tube or sheath 4 covering the wire cable 3. As shown in FIG. 3, the wire cable 3 is connected at one end 5a to a throttle valve opening/closing member 11 of a carburetor 5 of the engine 14 and at the other end 1a to a first throttle lever 1 pivotally coupled to a front handle 12. The outer tube 4 covering the wire cable 3 is fixedly secured at one end 4a to the machine body by a fastening means 6. The other end 4b of the outer tube 4 is freely slidable on the wire cable 3 in conformity with a curvature deformation of the wire cable 3.

An L-shaped bracket 7 is fixed to the freely movable end 4b of the outer tube 4. Further, the L-shaped bracket 7 is coupled by pin means 16 to a link member 8 which in turn is swingably held to the machine body. Namely, the link member 8 and the freely movable end 4b of the outer tube 4 are coupled to each other in such a manner that these members may be each moved linearly and angularly.

An elongated slot 9 is formed in the link member 8. An end 10a of a connecting rod 10 which is moved in corporation with a second throttle lever 2 is slidably moved within the elongated slot 9. In the embodiment shown, the end 10a of the connecting rod 10 which is slidably moved within the slot 9 is bent so as to be engagable with an end of the elongated slot 9.

FIG. 3 is an illustration showing a primary part of the throttle lever mechanism in the case where the operator does not hold the machine body but the engine is operated at an idle speed.

Figure 4:
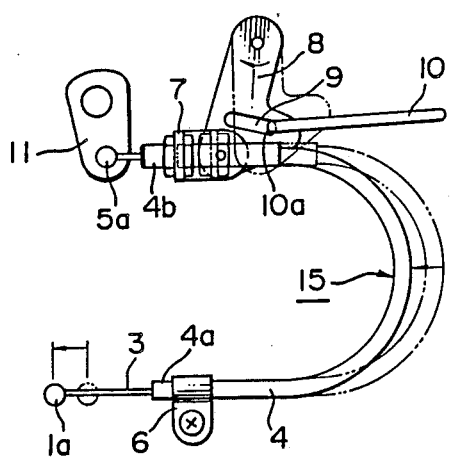
FIGS. 4 and 5 views illustrating stepwise operations in which in the throttle lever mechanism shown in FIG. 3, the first lever is pulled first and then the second lever is pulled.

With such arrangement, when the operator grips the front handle 12 by his hand while pulling the first throttle lever 1, the end 1a of the wire cable 3 is moved leftwardly as shown in FIG. 4. At this time, since the one end 4a of the outer tube 4 is held by the fastening means 6, a part of the curved throttle cable 15 is deformed to the condition as indicated by solid lines in FIG. 4. As the throttle cable 15 is deformed, the freely movable end 4b of the outer tube 4 is moved leftwardly while sliding on the wire cable 3. In compliance with this deformation, the link member ia also moved leftwardly. The deformation os displacement of the throttle cable 15 and the link member 8 is finally shown in FIG. 4.

Although the movement of the components by the operation of the first lever 1 has been described above, it should be noted that the throttle valve opening/closing member 11 for the carbretor 5 and the one end 5a of the wire cable 3 are kept unchanged in constant positions under the engine idle condition. The reason for this is that the deformation of the wire cable 15 caused by the operation of the first throttle lever 1 is absorbed by the rigidity and the deformation of the outer tube 4.

Figure 5:
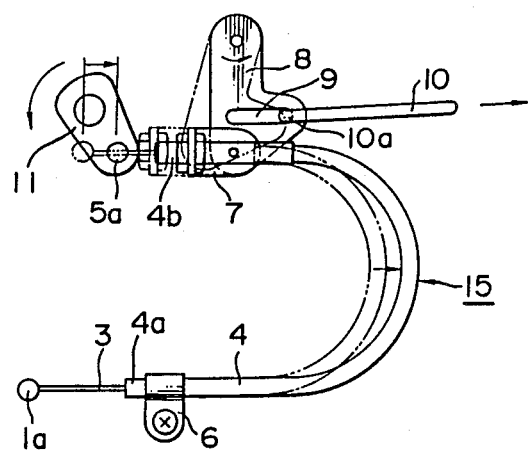

Under such a condition, when a rear handle 13 is gripped by the other hand to pull the second throttle lever 2 so that the connecting rod 10 is pulled in the right in FIG. 5, the bent end 10a of the connecting rod 10 is brought into contact with a right end of the elongated slot 9 to return to the right the link member 8 which has been swung to the left. As a result, the outer tube 4 having rigidity is returned to the original position indicated by solid lines in FIG. 5. Since the other end 1a of the wire cable 3 is kept at the constant position by the first lever 1, the end 5a is moved to the right as indicated by the solid line, so that the throttle valve opening/closing member 11 is moved, thus adjusting the throttle.

In contrast to the above-described operation, when either one of the first and second throttle levers 1 and 2 is released from the operator's hand, the one end 5a of the wire cable 3 is returned back to the position shown by the solid line in FIG. 4 and the opening/closing member 11 is also returned back to the original or home position, so that the engine is returned back to the idling condition.

Figure 6:
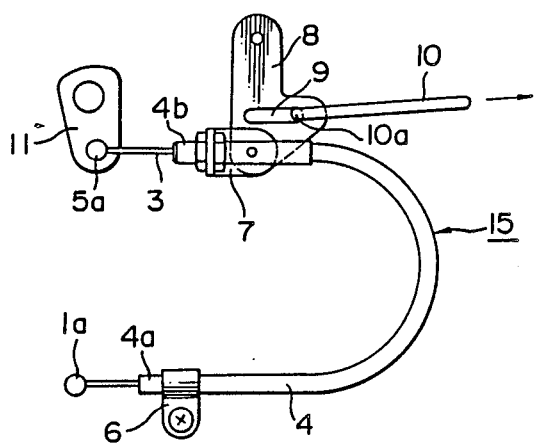
FIGS. 6 and 7 are views illustrating stepwise operations in which the second lever is pulled first and the first lever is pulled.

FIG. 6 shows the case where the throttle operation is commenced by the second throttle lever 2 unlike the case shown in FIG. 4. Even if the second throttle lever 2 is solely pulled, the end 10a of the connecting rod 10 is simply moved rightwardly along the elongated slot 9 of the link member 8 but there is no deformation of the throttle cable 15. Under this condition, when the first throttle lever 1 is also pulled as shown in FIG. 7 to move the end 1a of the wire cable 3 leftwardly, since the connecting rod 10 serves to prevent the leftward movement of the other end 4b of the outer tube 4 through the link member 8, the one end 5a of the wire cable 3 is moved rightwardly to move the opening/closing member 11 and to perform the corresponding throttle adjustment.

Figure 7:
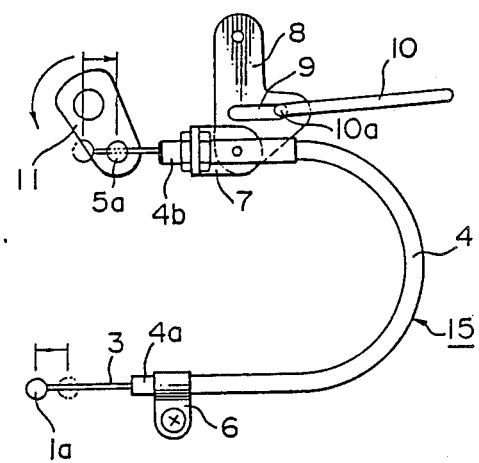

In the same manner as in the operational order explained in conjunction with FIGS. 4 and 5, when the operator's hand separates away from either one of the first and second throttle levers in the case of FIGS. 6 and 7, the one end 5a of the wire cable 3 is returned back to the solid position in FIG. 6, so that the engine is returned back t the original idling condition.

What is claimed is:

1. A throttle lever mechanism for use in a machine comprising:
   a wire cable arranged in a curved manner having a first end and a second end, said first end connected to a throttle valve opening and closing member of a carburetor;
   a first throttle level for operation by one hand of an operator, said second end being connected to said first throttle lever;
   an outer tube covering said wire cable having a first end portion and a second end portion, said first end portion being held in a stationary manner;
   a link member having an elongated slot formed therein and being rotatably supported on a machine body, said second end portion of said outer tube being coupled to said link member;
   a second throttle level for operation by the other hand of the operator;
   a connecting rod movable within the elongated slot and connecting said link member to said second throttle lever, and
   wherein when either of said first and second throttle levers is released from the respective hand of the operator said first end of said wire cable is returned to a first position and the throttle valve opening and closing member is returned to a home position such that an engine of the machine is returned to an idling condition.

2. The throttle level mechanism according to claim 1, wherein an L-shaped bracket is fixedly secured to the other end portion of the outer tube, and the bracket is connected to the link member through pin means.

* * * * *